INVENTOR.
EDMUND H. MERZ.
BY
ATTORNEY

Sept. 17, 1957　　　　　E. H. MERZ　　　　　2,806,812
METHOD FOR THE PREPARATION OF FORMED THERMOPLASTIC SHEETS
HAVING A RESIN FOAM INTEGRALLY BONDED THERETO
Filed Nov. 2, 1955　　　　　　　　　　　　2 Sheets-Sheet 2

INVENTOR.
EDMUND H. MERZ.
BY
ATTORNEY

United States Patent Office 2,806,812
Patented Sept. 17, 1957

2,806,812
METHOD FOR THE PREPARATION OF FORMED THERMOPLASTIC SHEETS HAVING A RESIN FOAM INTEGRALLY BONDED THERETO

Edmund H. Merz, Wilbraham, Mass., assignor to Monsanto Chemical Company, St. Louis, Mo., a corporation of Delaware Application November 2, 1955, Serial No. 544,561

4 Claims. (Cl. 154—100)

This invention relates to methods for preparing laminated plastic structures and particularly to methods for preparing formed thermoplastic sheets having a resin foam integrally bonded thereto.

In the manufacture of numerous articles it would be desirable to have a formed thermoplastic sheet having a resin foam integrally bonded thereto. For example, such laminated structures would be useful in the manufacture of refrigerator panels, light weight shipping containers, life belts, novelties, etc. Heretofore, to manufacture such laminated structures it has been necessary to form a thermoplastic sheet, to foam the foamable resin composition in a mold conforming to the contours of the formed thermoplastic sheet and finally to cement the formed thermoplastic sheet and the resin foam together with an adhesive. Such processes are unwieldy and are employed only where the contours of the formed thermoplastic sheet are relatively simple. Where the contours of the formed thermoplastic sheet are complex, alternate fabrication methods usually are employed to eliminate the need for the laminated structures previously described.

Consequently, it is an object of this invention to provide an improved process for preparing formed thermoplastic sheets having a resin foam integrally bonded thereto.

Figure 1:
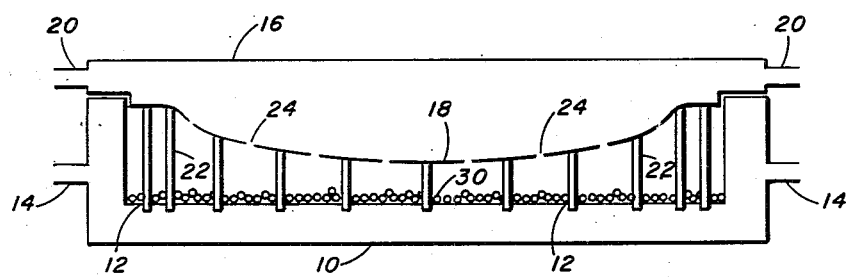
Figure 2:
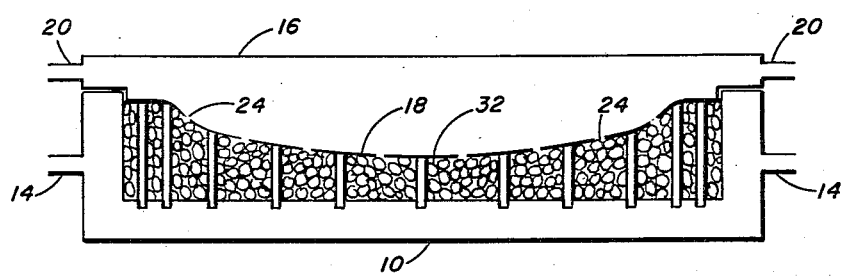
Figure 3:
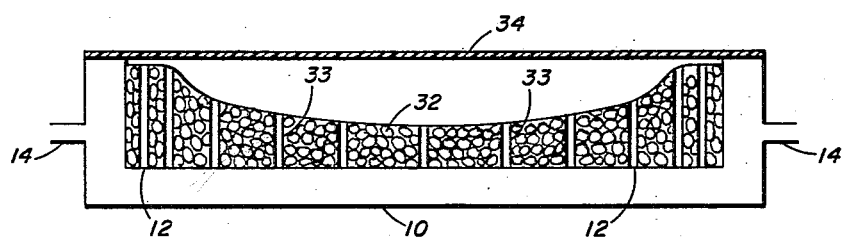
Figure 4:
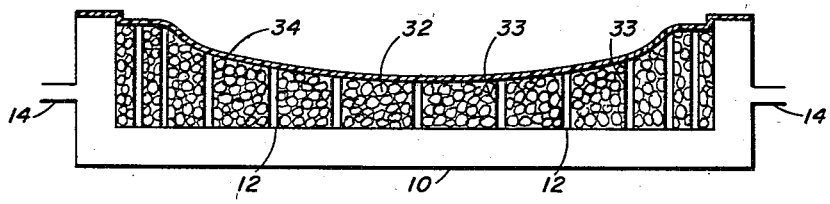
Figure 5:
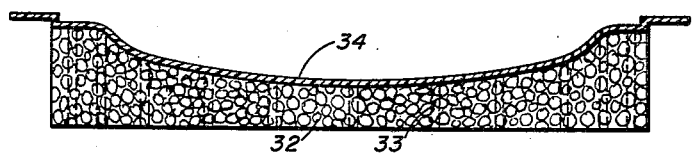
Figure 6:
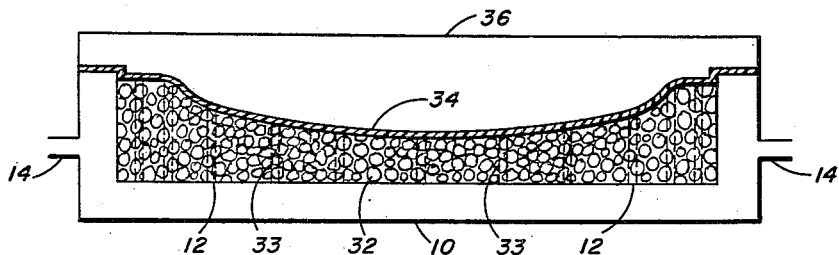

Other objects and advantages of this invention will be apparent from the following detailed description thereof when read in conjunction with the attached drawings in which:

Fig. 1 is a side elevation view of an operative mold assembly containing a foamable resin composition before foaming, Fig. 2 is a view of the mold assembly of Fig. 1 after foaming the foamable resin composition, Fig. 3 is a side elevation view partly in section of the mold assembly of Fig. 2 with the top mold half and dependent rods removed therefrom and replaced with a sheet of thermoplastic resin, Fig. 4 is a view of the assembly of Fig. 3 after vacuum drawing the thermoplastic sheet, Fig. 5 is a view of the laminate formed in Fig. 4 removed from the mold, and Fig. 6 is a side elevation view partly in section of the mold and laminate assembly from Fig. 4 having placed thereon a covering mold conforming to the contours of the vacuum drawn sheet.

A highly efficient process has been discovered for preparing formed thermoplastic sheets having a resin foam integrally bonded thereto. In this method (1) a foamable resin composition is foamed in a mold assembly in which a plurality of rods project from one mold surface to the other, (2) one mold half and the rods are removed from the mold assembly leaving in the remaining mold half a resin foam having a plurality of channels running from the surface thereof to the bottom of the mold half, (3) a thermoplastic sheet is placed over the resin foam, (4) the thermoplastic sheet is heated, and (5) a vaccum is drawn on the mold half which communicates with the channels in the resin foam and thus draws the heated thermoplastic sheet into engagement with the resin foam.

In Fig. 1 there is provided a cored mold half 10 whose face surface 11 contains a plurality of small openings 12—12. Mold half 10 is provided with ports 14—14 through which heating or cooling liquids may be circulated or through which a vacuum can be drawn. A covering cored mold half 16 is provided which has a curved surface 18. Ports 20—20 are provided in mold half 16 for the circulation of heating or cooling liquids or for the application of a vacuum. Dependent from curved surface 18 are a plurality of rods 22—22 which pass through the cooperatively positioned holes 12—12 in the face of mold half 10. Small openings 24—24 are also provided in surface 18 so that heating or cooling liquids from the core of mold half 16 may enter the cavity defined by mold halves 10 and 16.

In the first step of the process, a quantity of foamable resin beads 30—30 is placed on face 11 of mold half 10. Steam is passed through the core of mold half 16 and a portion thereof passes through openings 24—24 provided in surface 18. This steam contacts the foamable beads 30—30 and foams same into a voluminous mass of resin foam 32 (see Fig. 2).

In the next step of the process, illustrated by Figs. 3, 4 and 5, mold half 16 with its dependent rods 22—22 is removed from mold half 10 and resin foam 32. Removal of the rods from resin foam 32 leaves small vertical channels 33—33 therein which run from the surface of the resin foam to the face of mold half 10. In Fig. 3 a sheet of thermoplastic resin 34 is clamped to the top surface of mold half 10 by clamping means not shown. After heating sheet 34, a vacuum is applied to ports 14—14 of mold half 10 and this reduces the pressure in the cavity defined by thermoplastic sheet 14 and resin foam 32, since this cavity communicates with the mold core through vertical channels 33—33 of resin foam 32 and the cooperatively positioned holes 12—12 in surface 11 of mold half 10. Atmospheric pressure then forces thermoplastic sheet 34 into pressured engagement with the face of resin foam 32. Fig. 5 depicts the finished laminate removed from mold half 10.

Vertical channels 33—33 which remain in resin foam 32 have small diameters and do not adversely affect the strength or insulating properties of the laminate. Where, however, it is desired to seal these channels, it can be done as illustrated in Fig. 6. A solid mold 36, whose mold surface is contoured to that of the vacuum drawn thermoplastic sheet 34, is placed on the assembly of finished laminate and mold half 10. Steam is admitted to the core of mold half 10 through ports 14—14 and enters channels 33—33 of resin foam 32. The steam causes further foaming of the resin contiguous to the channels 33—33 and foams same closed.

In addition to ease of fabrication, another major advantage of the laminated structures prepared by the method of this invention is that they are stronger and more rigid than corresponding unlaminated formed thermoplastic sheets. For example, a formed 0.020″ polystyrene sheet that is laminated to a layer of foamed polystyrene by the method of this invention is equivalent in rigidity to an unlaminated formed 0.080″ polystyrene sheet and is at the same time lighter in weight. The importance of this phenomenon is that light gauge thermoplastic sheets can be formed into complex forms and simultaneously laminated to a resin foam to provide rigid, yet light weight, merchandising packages, display cases, etc.

The present invention is particularly adapted to the manufacture of refrigerator panels, especially panels for refrigerator doors. Refrigerator doors customarily are prepared by forming an interior panel by vacuum drawing a thermoplastic sheet, attaching said vacuum drawn thermoplastic sheet to the outer door panel and filling the cavity between the inner and outer panels with glass wool. This manufacturing process is time consuming and costly in that considerable hand labor is involved. By the process of the present invention, however, an interior door panel and a resin foam insulating layer conforming to the geometry of the outer door panel can be prepared. The refrigerator door then can be fabricated by simply assembling the formed thermoplastic sheet-resin foam laminate and the outer door panel.

Essentially any foamable thermosetting or thermoplastic resin composition can be employed in the practice of this invention. Such foamable resin compositions consist of a predominant proportion of resin and a small proportion of a blowing, foaming or pore forming agent. For convenience in handling, such compositions preferably are employed in the form of small beads or granules. In many cases such beads will be partially foamed before they are employed in this process.

Examples of resins that may be employed include thermosetting resins such as the phenol-aldehyde types, the urea-aldehyde types, the melamine-aldehyde types and thermoplastic resins such as cellulose ethers and esters, e. g., methyl cellulose, ethyl cellulose, cellulose acetate; homopolymers and interpolymers derived from monomers containing the vinylidene group $CH_2=C<$ such as the vinyl halides, e. g., vinyl chloride, vinyl bromide; vinylidene chloride; olefins, e. g., ethylene, isobutylene; vinyl esters of carboxylic acids, e. g., vinyl acetate, vinyl propionate, vinyl benzoate; vinyl ethers, e. g., vinyl methyl ether, vinyl isobutyl ether; unsaturated carboxylic acids and derivatives thereof, e. g., acrylic acid, acrylic acid esters, acrylamide, acrylonitrile, methacrylic acid and its corresponding derivatives; vinyl aromatic compounds, e. g., styrene, vinyl toluene, alpha-methylstyrene, o-chlorostyrene, 2,5-dichlorostyrene and interpolymers of such vinylidene monomers with alpha,beta-unsaturated polycarboxylic acids and their derivatives, e. g., maleic anhydride, diethyl maleate, dibutyl fumarate, diallyl maleate, etc.

Suitable foaming or blowing agents for the foamable resin compositions are well known in the art and the selection of the particular foaming or blowing agent to be employed will be dictated largely by the particular resin in which it is to be incorporated. In some cases the foaming agent may be generated in situ, as for example in the preparation of polyurethane foams by reacting polyesters with polyisocyanates.

A preferred foamable resin composition for use in the practice of the present invention comprises polystyrene having incorporated therein as a foaming agent a volatile, non-reactive, organic liquid which has only a slight solvent action on the polystyrene. Examples of suitable foaming agents for this system include pentane, hexane, heptane, petroleum ether, cyclopentane, cyclopentadiene, acetone, methanol, methyl acetate, ethyl acetate, methyl formate, ethyl formate, dichloroethylene, isopropyl chloride, propionaldehyde and diisopropyl ether.

Any thermoplastic sheet that can be fabricated by vacuum drawing techniques may be employed in the process of the present invention. Examples of such sheets include those prepared from cellulose ethers and esters, e. g., methyl cellulose, ethyl cellulose, cellulose nitrate, cellulose acetate, cellulose butyrate, cellulose acetate-butyrate; homopolymers and interpolymers derived from monomers containing the vinylidene $CH_2=C<$ group such as vinyl halides, e. g., vinyl chloride, vinyl bromide; vinylidene chloride; olefins, e. g., ethylene, isobutylene; vinyl esters of carboxylic acids, e. g., vinyl acetate, vinyl propionate, vinyl benzoate; vinyl ethers, e. g., vinyl methyl ether, vinyl isobutyl ether; unsaturated carboxylic acids and derivatives thereof, e. g., acrylic acid, acrylic acid esters, acrylamide, acrylonitrile, methacrylic acid and its corresponding derivatives; vinyl aromatic compounds, e. g., styrene, vinyl toluene, alpha-methylstyrene, o-chlorostyrene, 2,5-dichlorostyrene, 2,4-dimethylstyrene; and interpolymers of such vinylidene monomers with alpha,beta-unsaturated polycarboxylic acids and derivatives thereof, e. g., maleic anhydride, diethyl maleate, dibutyl fumarate, diallyl maleate, etc. The thermoplastic sheets employed also may be fabricated from blends of two or more polymeric materials, e. g., blends of polyvinyl chloride and butadiene-acrylonitrile interpolymers, blends of polystyrene with rubbery diene polymers such as natural rubber, butadiene-styrene interpolymers and butadiene-acrylonitrile interpolymers, etc. or high impact polystyrene prepared by polymerizing monomeric styrene in the presence of rubbery diene polymers. It is generally desirable to prepare the laminated structures of this invention from thermoplastic sheets which are hard and rigid at room temperature. Prime examples of such sheets include sheets of polyvinyl chloride and sheets of polystyrene or high impact polystyrene.

Pigments, coloring materials, antioxidants, lubricants, stabilizers, etc. may be incorporated in both the thermoplastic resin sheets and foamable resin compositions.

When the foamable resin composition employed is a thermoplastic resin having incorporated therein as a foaming agent a volatile, non-reactive, organic liquid, it is preferred practice to foam the resin by physically contacting the resin with steam. The invention, however, is not limited to this particular mode of foaming the resin and other well known heating means may be employed for this purpose.

Depending upon a multitude of factors, it may or may not be necessary to use an adhesive to obtain a strong bond between the formed thermoplastic sheet and the resin foam. Where the thermoplastic sheet and the foamed resin employed are based upon the same resin, e. g. where a polystyrene sheet is employed with foamed polystyrene, a strong physical bond is usually obtained without the use of adhesives. Where the thermoplastic sheet and the resin foam employed are of different chemical types it is usually good practice to employ a suitable adhesive.

The above descriptions and particularly the examples are set forth by way of illustration only. It will be obvious to those skilled in the art that many variations and modifications thereof can be made without departing from the spirit and scope of the invention herein described.

What is claimed is:

1. A method for preparing a manufactured article comprising a formed thermoplastic sheet having bonded thereto a layer of foamed resin which comprises the steps; (1) preparing a mold assembly having a plurality of rods projecting from one mold surface to the other, (2) charging a foamable resin composition into the mold cavity, (3) foaming the foamable resin composition so as to fill the mold cavity, (4) removing one mold half and the rods from the first prepared mold assembly to leave the remaining mold half containing a resin foam having a plurality of channels running from the exposed surface thereof to the bottom of the mold half, (5) covering the remaining mold half with a thermoplastic sheet, (6) heating said thermoplastic sheet and (7) applying a vacuum to the mold and drawing the thermoplastic sheet into engagement with the resin foam.

2. The method of claim 1 in which the foamable resin composition employed is a foamable polystyrene composition.

3. The method of claim 2 in which the thermoplastic sheet employed is a sheet of a styrene polymer.

4. The method of claim 1 in which the thermoplastic sheet employed is a sheet of a styrene polymer.

References Cited in the file of this patent

UNITED STATES PATENTS

| | | |
|---|---|---|
| 2,382,784 | Emery | Aug. 14, 1945 |
| 2,590,221 | Stevens | Mar. 25, 1952 |
| 2,614,059 | Cooper | Oct. 14, 1952 |
| 2,660,761 | Peters | Dec. 1, 1953 |
| 2,766,808 | Kleiber et al. | Oct. 16, 1956 |

FOREIGN PATENTS

| | | |
|---|---|---|
| 1,036,862 | France | Apr. 29, 1953 |